US012631507B2

(12) United States Patent
Fan et al.

(10) Patent No.: US 12,631,507 B2
(45) Date of Patent: May 19, 2026

(54) CLAMPING FORCE MEASUREMENT SYSTEM AND METHOD FOR HEAD-MOUNTED DEVICE

(71) Applicant: Lanto Electronic Limited, Kunshan City (CN)

(72) Inventors: Sheng Cyuan Fan, Kunshan City (CN); Chien Kai Tseng, Kunshan City (CN); Chuan Hsin Chang, Kunshan City (CN); Han-Ting Chin, Kunshan City (CN)

(73) Assignee: LANTO ELECTRONIC LIMITED, Kunshan City (CN)

( * ) Notice: Subject to any disclaimer, the term of this patent is extended or adjusted under 35 U.S.C. 154(b) by 317 days.

(21) Appl. No.: 18/232,464

(22) Filed: Aug. 10, 2023

(65) Prior Publication Data

US 2024/0201033 A1      Jun. 20, 2024

(30) Foreign Application Priority Data

Dec. 19, 2022      (CN) .......................... 202211633231.7

(51) Int. Cl.
| | |
|---|---|
| *G01L 7/06* | (2006.01) |
| *G01L 19/00* | (2006.01) |
| *G02B 27/01* | (2006.01) |

(52) U.S. Cl.
CPC .......... *G01L 7/061* (2013.01); *G01L 19/0007* (2013.01); *G02B 27/0176* (2013.01)

(58) Field of Classification Search
CPC ... G01L 5/00; G01L 5/24; G01L 5/226; G01L 1/22; G01L 5/009; G01L 5/0028;
(Continued)

(56) References Cited

U.S. PATENT DOCUMENTS 7,773,767 B2      8/2010  Wahl et al.
9,038,486 B2 *    5/2015  Stoneback ............ G01L 5/0085
                                                       73/831
(Continued)

FOREIGN PATENT DOCUMENTS

CN        201657251 U      11/2010
CN        103297890 A        9/2013
(Continued)

OTHER PUBLICATIONS

Chinese Office Action and Search Report for Chinese Application No. 202211633231.7, dated Jun. 25, 2025, with English translation.
(Continued)

*Primary Examiner* — Andre J Allen
(74) *Attorney, Agent, or Firm* — Birch, Stewart, Kolasch & Birch, LLP

(57)      ABSTRACT

Provided are a clamping force measurement system and method for a head-mounted device. The clamping force measurement system for a head-mounted device includes a pressure sensing module and a measurement module. The measurement module includes at least two measurement device and at least one gas guide device. A measurement device includes at least one hollow compressible unit. The measurement device is configured to discharge gas when the volume of the measurement device is deformed during extrusion. A first end of a gas guide device is in communication with a measurement device. A second end of the gas guide device is in communication with the pressure sensing module to transmit the gas to the pressure sensing module. The pressure sensing module is configured to determine the clamping force of the head-mounted device according to the pressure value of the gas.

20 Claims, 4 Drawing Sheets

(58) Field of Classification Search

CPC ... G01L 5/228; G01L 1/16; G01L 1/18; G01L 5/0033; G01L 5/0038; G01L 1/26; G01L 5/0076; G01L 5/166; G01L 5/16; G01L 5/28; G01L 5/0061; G01L 5/246; G01L 5/0004; G01L 1/2287; G01L 25/00; G01L 1/14; G01L 5/22; G01L 1/04; G01L 1/20; G01L 1/246; G01L 1/146; G01L 5/0042; G01L 5/0057; G01L 5/243; G01L 1/24; G01L 5/1627; G01L 1/2206; G01L 1/2231; G01L 1/205; G01L 5/162; G01L 1/00; G01L 1/142; G01L 5/0085; G01L 1/02; G01L 5/167; G01L 1/242; G01L 9/0075; G01L 1/005; G01L 5/0019; G01L 1/255; G01L 19/147; G01L 1/2262; G01L 1/243; G01L 5/04; G01L 1/225; G01L 5/10; G01L 5/165; G01L 5/008; G01L 5/06; G01L 5/221; G01L 5/0009; G01L 19/0023; G01L 3/00; G01L 1/122; G01L 1/25; G01L 3/1457; G01L 5/107; G01L 5/225; G01L 9/0072; G01L 1/10; G01L 1/12; G01L 9/008; G01L 1/2243; G01L 5/102; G01L 1/2218; G01L 11/025; G01L 1/165; G01L 13/025; G01L 19/003; G01L 3/14; G01L 5/101; G01L 19/04; G01L 5/223; G01L 9/0002; G01L 5/0066; G01L 5/0071; G01L 5/103; G01L 9/08; G01L 1/044; G01L 1/162; G01L 19/14; G01L 3/08; G01L 5/047; G01L 5/108; G01L 5/12; G01L 1/247; G01L 19/148; G01L 25/003; G01L 1/106; G01L 1/2281; G01L 19/0046; G01L 5/0052; G01L 19/0627; G01L 5/106; G01L 1/042; G01L 5/161; G01L 9/0022; G01L 11/06; G01L 19/00; G01L 19/0645; G01L 5/20; G01L 1/125; G01L 1/127; G01L 19/142; G01L 23/222; G01L 3/108; G01L 9/0086; G01L 1/183; G01L 1/248; G01L 23/10; G01L 9/0001; G01L 9/006; G01L 9/06; G01L 1/144; G01L 1/241; G01L 11/04; G01L 3/10; G01L 3/102; G01L 3/12; G01L 5/0047; G01L 9/065; G01L 1/2293; G01L 27/005; G01L 5/042; G01L 5/136; G01L 9/00; G01L 9/0041; G01L 9/0052; G01L 3/106; G01L 3/242; G01L 5/045; G01L 5/1623; G01L 9/12; G01L 11/004; G01L 17/00; G01L 19/0007; G01L 27/002; G01L 3/1464; G01L 5/169

See application file for complete search history.

(56) References Cited

U.S. PATENT DOCUMENTS

| | | | |
|---|---|---|---|
| 2014/0159995 A1 | 6/2014 | Adams et al. | |
| 2017/0090604 A1 | 3/2017 | Barbier | |

FOREIGN PATENT DOCUMENTS

| | | | | | |
|---|---|---|---|---|---|
| CN | 101762354 B | | 6/2014 | | |
| CN | 104937093 A | | 9/2015 | | |
| CN | 110049396 A | | 7/2019 | | |
| CN | 209627641 U | | 11/2019 | | |
| CN | 110967135 A | | 4/2020 | | |
| CN | 211296928 U | | 8/2020 | | |
| CN | 211477502 U | | 9/2020 | | |
| CN | 214381351 U | | 10/2021 | | |
| CN | 113884230 A | | 1/2022 | | |
| CN | 215581655 U | | 1/2022 | | |
| CN | 216645681 U | | 5/2022 | | |
| CN | 217424619 U | * | 9/2022 | | |
| CN | 115211103 A | | 10/2022 | | |
| CN | 217980624 U | * | 12/2022 | | |
| CN | 218994591 U | * | 5/2023 | | |
| CN | 219084289 U | * | 5/2023 | | |
| CN | 118050109 A | * | 5/2024 | ........... | G01M 13/00 |
| CN | 222618072 U | * | 3/2025 | | |
| CN | 119880204 A | * | 4/2025 | .............. | G01L 1/16 |
| IT | 102018000006185 A1 | | 12/2019 | | |
| TW | 202215110 A | | 4/2022 | | |
| TW | 202240241 A | | 10/2022 | | |
| WO | WO 2012/052078 A1 | | 4/2012 | | |
| WO | WO 2015/165782 A2 | | 11/2015 | | |
| WO | WO 2021/140182 A1 | | 7/2021 | | |

OTHER PUBLICATIONS

Hu et al., "Trademark Pattern Tilt Correction Based on Fourier and Hough Transformation," Light Industry Machinery, vol. 36, No. 1, Feb. 2018, pp. 62-65, with an English abstract.

Taiwanese Office Action and Search Report for Taiwanese Application No. 113108701, dated Nov. 18, 2024, with English translation.

* cited by examiner

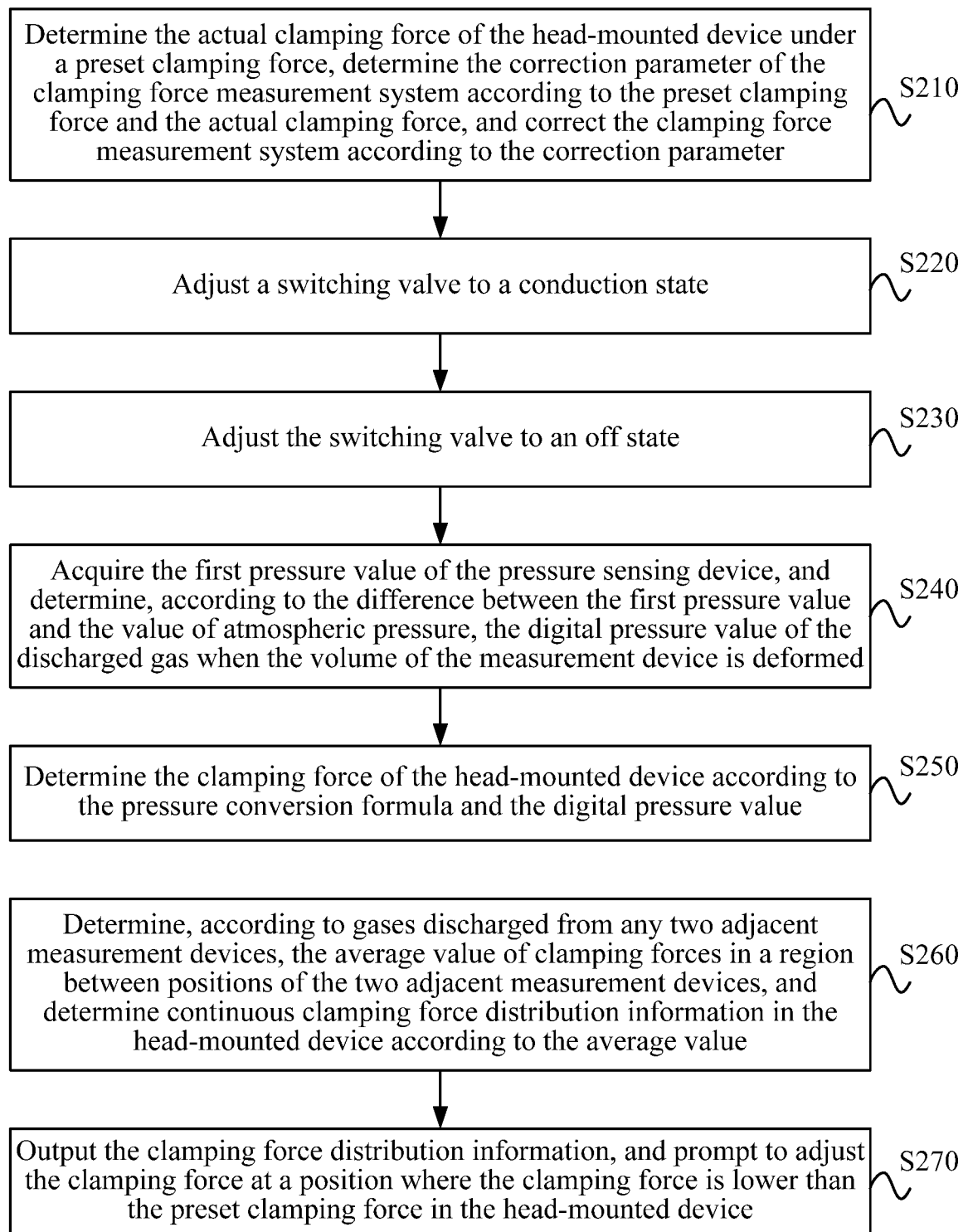

Determine the actual clamping force of the head-mounted device under a preset clamping force, determine the correction parameter of the clamping force measurement system according to the preset clamping force and the actual clamping force, and correct the clamping force measurement system according to the correction parameter   S210

Adjust a switching valve to a conduction state   S220

Adjust the switching valve to an off state   S230

Acquire the first pressure value of the pressure sensing device, and determine, according to the difference between the first pressure value and the value of atmospheric pressure, the digital pressure value of the discharged gas when the volume of the measurement device is deformed   S240

Determine the clamping force of the head-mounted device according to the pressure conversion formula and the digital pressure value   S250

Determine, according to gases discharged from any two adjacent measurement devices, the average value of clamping forces in a region between positions of the two adjacent measurement devices, and determine continuous clamping force distribution information in the head-mounted device according to the average value   S260

Output the clamping force distribution information, and prompt to adjust the clamping force at a position where the clamping force is lower than the preset clamping force in the head-mounted device   S270

FIG. 6

CLAMPING FORCE MEASUREMENT SYSTEM AND METHOD FOR HEAD-MOUNTED DEVICE

CROSS-REFERENCE TO RELATED APPLICATION

This application claims priority to Chinese patent application No. 202211633231.7 filed with the CNIPA on Dec. 19, 2022, the disclosure of which is incorporated herein by reference in its entirety.

TECHNICAL FIELD

The present disclosure relates to the technical field of clamping force measurement and, in particular, to a clamping force measurement system and method for a head-mounted device.

BACKGROUND

When a user wears a headset, the headset head beam provides a clamping force for fixing the headset to two sides of the head of the user. Earpads provide cushioning for the user. The amount of the clamping force provided by the headset head beam and the tightness between the earpads and ears of the user affect the comfort and auditory feeling of the user.

According to the method for evaluating the comfort and tightness of the headset of a user in the related art, the clamping force is generally used as an evaluation parameter. For example, the headset is fixed behind a fixture so that the earpads abut against a metal plane. The metal plane is connected to a pressure sensor by using a connection rod to measure the clamping force of the headset. However, in the process of measuring the clamping force through the metal plane and the connection rod in the related art, part of the clamping force may drive the connection rod to move through the metal plane, thereby causing the loss of an extrusion force and making the measurement result of the extrusion force inaccurate.

SUMMARY

Embodiments of the present disclosure provide a clamping force measurement system for a head-mounted device, in which a volume change during extrusion is converted into a pressure change by at least one hollow compressible unit and a gap guide device, and a clamping force is determined by a pressure sensing module so that the measurement result is more accurate.

An embodiment of the present disclosure provides a clamping force measurement system for a head-mounted device. The clamping force measurement system includes a pressure sensing module and a measurement module. The measurement module includes at least two measurement device and at least one gas guide device. Each of the at least two measurement device includes at least one hollow compressible unit. Each of the at least two measurement device is configured to discharge gas when the volume of the each of the at least two measurement device is deformed during extrusion. A first end of a gas guide device is in communication with a measurement device. A second end of the gas guide device is in communication with the pressure sensing module to transmit the gas to the pressure sensing module. The pressure sensing module is configured to determine the clamping force of the head-mounted device according to the pressure value of the gas; where a clamping space is formed between two of the at least two measuring devices and the clamping space is configured for clamping to the head.

In an exemplary embodiment, the measurement module includes multiple measurement devices and multiple gas guide devices, the multiple gas guide devices are in communication with the multiple measurement devices in a one-to-one manner. The pressure sensing module includes multiple connection ports. A gas guide device is configured to transmit gas discharged from one of the multiple measurement devices to a respective one of the multiple connection ports.

In an exemplary embodiment, the multiple measurement devices are uniformly distributed along a circumference direction.

In an exemplary embodiment, the measurement module also includes an annular double-layer film. The annular double-layer film is hollow and annular. The at least two measurement device is disposed in the annular double-layer film.

In an exemplary embodiment, the each measurement devices is a hollow compressible unit matrix. The each measurement device includes multiple hollow compressible units. The multiple hollow compressible units are disposed in communication. At least one of the multiple hollow compressible unit is in communication with the gas guide device of the at least one gas guide device.

In an exemplary embodiment, the pressure sensing module includes at least one pressure sensing device and a processing device. A pressure sensing device of the at least one pressure sensing device is in communication with the second end of the gas guide device to sense the pressure of the gas. The processing device is electrically connected to the pressure sensing device to determine the clamping force of the head-mounted device according to the pressure of the gas.

In an exemplary embodiment, the pressure sensing module also includes a conversion and display device. The conversion and display device is electrically connected to the processing device and configured to convert an analog signal output from the processing device into a digital signal and display the clamping force determined by the processing device.

In an exemplary embodiment, the gas guide device also includes a third end and a switching valve. The switching valve is disposed in a gas path between the third end and atmospheric pressure. The pressure sensing module is electrically connected to the switching valve to control conduction and off of the switching valve.

In an exemplary embodiment, the clamping force measurement system includes a posture adjustment module. The posture adjustment module includes a clamping force distribution information receiving end. The pressure sensing module includes a clamping force distribution information output end. The clamping force distribution information output end is electrically connected to the clamping force distribution information receiving end. The posture adjustment module is configured to adjust the posture of the head-mounted device according to the clamping force distribution information.

An embodiment of the present disclosure also provides a clamping force measurement method for a head-mounted device. The clamping force measurement method is applied by any of the preceding clamping force measurement systems for a head-mounted device. The clamping force measurement method for a head-mounted device includes acquiring the digital pressure value of a discharged gas when the volume of a measurement device is deformed and determining the clamping force of the head-mounted device according to the digital pressure value.

In an exemplary embodiment, before acquiring the digital pressure value of the discharged gas when the volume of the measurement device is deformed, the method also includes determining the actual clamping force of the head-mounted device under a preset clamping force; determining the correction parameter of the clamping force measurement system according to the preset clamping force and the actual clamping force; and correcting the clamping force measurement system according to the correction parameter.

In an exemplary embodiment, the gas guide device also includes a third end and a switching valve. The switching valve is disposed in a gas path between the third end and atmospheric pressure. The pressure sensing module includes a conduction control signal output end. The switching valve includes a conduction control signal receiving end. The conduction control signal receiving end is electrically connected to the conduction control signal output end.

Before acquiring the digital pressure value of the discharged gas when the volume of the measurement device is deformed, the method also includes adjusting the switching valve to a conduction state so that pressure in the measurement device is the same as the atmospheric pressure.

In an exemplary embodiment, after adjusting the switching valve to the conduction state so that the pressure in the measurement device is the same as the atmospheric pressure, the method also includes adjusting the switching valve to an off state.

In an exemplary embodiment, the pressure sensing module includes at least one pressure sensing device, a processing device, and a conversion and display device. Acquiring the digital pressure value of the discharged gas when the volume of the measurement device is deformed includes acquiring a first pressure value of the pressure sensing device; and according to a difference between the first pressure value and the value of atmospheric pressure, determining the digital pressure value of the discharged gas when the volume of the measurement device is deformed.

In an exemplary embodiment, determining the clamping force of the head-mounted device according to the digital pressure value includes determining the clamping force of the head-mounted device according to a pressure conversion formula and the digital pressure value. The pressure conversion formula is $F = A \cdot P_2'$. F denotes a clamping force to which the measurement device is subjected. A denotes the force application area of the clamping force. $P_2'$ denotes the digital pressure value converted from an analog voltage signal.

In an exemplary embodiment, the measurement module includes multiple of measurement devices. After determining the clamping force of the head-mounted device according to the digital pressure value, the method also includes, according to gases discharged from any two adjacent measurement devices, determining the average value of clamping forces in a region between positions of the two adjacent measurement devices; and determining continuous clamping force distribution information in the head-mounted device according to the average value.

In an exemplary embodiment, after determining the continuous clamping force distribution in the head-mounted device according to the average value, the method also includes outputting the clamping force distribution information, and prompting to adjust a clamping force at a position where the clamping force is lower than a preset clamping force in the head-mounted device.

In an exemplary embodiment, the pressure sensing module includes a processing device and a conversion and display device. The conversion and display device is electrically connected to the processing device. Outputting the clamping force distribution information, and prompting to adjust the clamping force at the position where the clamping force is lower than the preset clamping force in the head-mounted device includes outputting the clamping force distribution information to the conversion and display device for the conversion and display device to display the clamping force distribution information, and prompting to adjust the clamping force at the position where the clamping force is lower than the preset clamping force in the head-mounted device.

In an exemplary embodiment, the clamping force measurement system includes a posture adjustment module. The posture adjustment module includes a clamping force distribution information receiving end. The pressure sensing module includes a clamping force distribution information output end. The clamping force distribution information output end is electrically connected to the clamping force distribution information receiving end.

Outputting the clamping force distribution information, and prompting to adjust the clamping force at the position where the clamping force is lower than the preset clamping force in the head-mounted device, including outputting the clamping force distribution information to the posture adjustment module to control the posture adjustment module to adjust the clamping force at the position where the clamping force is lower than the preset clamping force in the head-mounted device.

The clamping force measurement system for a head-mounted device in the present disclosure includes a pressure sensing module and a measurement module. The measurement module includes at least two measurement device and at least one gas guide device. Each measurement device includes at least one hollow compressible unit. The each measurement device is configured to discharge gas when the volume of the each measurement device is deformed during extrusion. A first end of a gas guide device is in communication with a measurement device. A second end of the gas guide device is in communication with the pressure sensing module to transmit the gas to the pressure sensing module. The pressure sensing module is configured to determine the clamping force of the head-mounted device according to the pressure value of the gas. According to the preceding technical solutions, the measurement device includes at least one hollow compressible unit. The volume of the hollow compressible unit is deformed during extrusion, and the gas is discharged through the first end of the gas guide device. The second end of the gas guide device is in communication with the pressure sensing module. Further, the clamping force measurement system converts the volume change of the measurement device into a pressure change. The clamping force is determined through the pressure sensing module. Compared with the related art in which part of the clamping force drives the connection rod to move through the metal plane in the process of measuring the clamping force through the metal plane and the connection rod, resulting in the loss of an extrusion force, the measurement result of the clamping force is more accurate in the present disclosure.

BRIEF DESCRIPTION OF DRAWINGS

FIG. 6 is a specific flowchart of a clamping force measurement method for a head-mounted device according to an embodiment of the present disclosure.

DETAILED DESCRIPTION

To make the objects, technical solutions, and advantages of the present disclosure clearer, the technical solutions of the present disclosure are described completely below in conjunction with the drawings in the embodiments of the present disclosure and specific implementations. Apparently, the embodiments described herein are part, not all, of the embodiments of the present disclosure. Based on the embodiments of the present disclosure, all other embodiments obtained by those of ordinary skill in the art on the premise that no creative work is done are within the scope of the present disclosure.

It is to be noted that the terms "first", "second" and the like in the description, claims, and drawings of the present disclosure are used to distinguish between similar objects and are not necessarily used to describe a particular order or sequence. It is to be understood that the data used in this way is interchangeable where appropriate so that the embodiments of the present disclosure described herein may also be implemented in a sequence not illustrated or described herein. In addition, the terms "including", "having", or any other variations thereof described herein are intended to encompass a non-exclusive inclusion. For example, a process, method, system, product, or device that includes a series of steps or units may include not only the expressly listed steps or units but also other steps or units that are not expressly listed or are inherent to such a process, method, product, or device.

Figure 1:
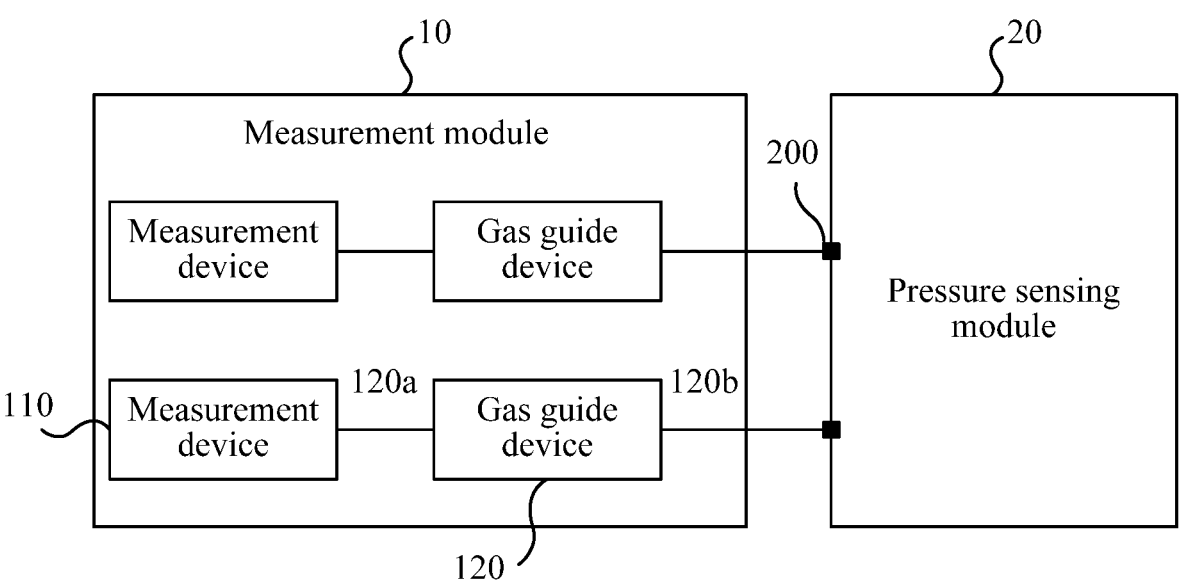
FIG. 1 is a block diagram illustrating the structure of a clamping force measurement system for a head-mounted device according to an embodiment of the present disclosure.

FIG. 1 is a block diagram illustrating the structure of a clamping force measurement system for a head-mounted device according to an embodiment of the present disclosure. Referring to FIG. 1, the clamping force measurement system for a head-mounted device includes a pressure sensing module 20 and a measurement module 10. The measurement module 10 includes at least two measurement device 110 and at least one gas guide device 120. Each of the at least two measurement device 110 includes at least one hollow compressible unit. Each of the at least two measurement device 110 is configured to discharge gas when volume of the each of the at least two measurement device is deformed during extrusion. A first end 120a of a gas guide device 120 is in communication with a measurement device 110. A second end 120b of the gas guide device is in communication with the pressure sensing module 20 to transmit the gas to the pressure sensing module 20. The pressure sensing module 20 is configured to determine the clamping force of the head-mounted device according to the pressure value of the gas. In the embodiment, a clamping space is formed between two of the at least two measurement device 110. The clamping space is configured for clamping to the head of a user.

In an exemplary embodiment, as shown in FIG. 1, the measurement module 10 includes the at least two measurement device 110 and the at least one gas guide device 120. A measurement device 110 includes at least one hollow compressible unit. A gas guide device 120 may be a gas guide tube. During measurement, the hollow compressible unit is compressed through the head-mounted device to deform the volume of the hollow compressible unit. The gas in the hollow compressible unit is discharged through the first end 120a of the gas guide device 120 into the gas guide device 120. The second end 120b of the gas guide device 120 is in communication with the pressure sensing module 20. By utilizing the characteristic that the volume deformation of the gas in the hollow compressible unit is caused by compression, the clamping force measurement system of the head-mounted device communicates the hollow compressible unit with the pressure sensing module 20 through the gas guide device 120 to convert the volume change of the hollow compressible unit into a pressure change. The pressure sensing module 20 determines the clamping force of the head-mounted device according to the pressure value of the compressed gas.

In addition, the pressure sensing module 20 measures a first pressure value in the measurement device 110 through communicating with the second end 120b of the gas guide device 120. After calculating the difference between the detected first pressure value in the measurement device 110 and the value of atmospheric pressure, the pressure sensing module 20 outputs an analog voltage signal (the voltage range of the analog voltage signal may be 0 V to 5 V). Then, the pressure sensing module 20 converts the output analog voltage signal into a digital pressure value, and substitutes the digital pressure value converted from the analog voltage signal into a pressure conversion formula according to the pressure conversion formula stored in the pressure sensing module 20, thereby determining the clamping force of the head-mounted device. The pressure conversion formula is $F = A \cdot P_2'$. F denotes a clamping force to which the measurement device is subjected. A denotes the force application area of the clamping force. $P_2'$ denotes the digital pressure value converted from the analog voltage signal.

It is to be understood that when the hollow compressible unit is compressed by the clamping force, the internal volume of the hollow compressible unit is reduced, and the discharged gas generates pressure. Since the hollow compressible unit is communicated with the pressure sensing module 20 through the gas guide device 120, it can be considered that the hollow compressible unit is sealed during the measurement process. According to a gas pressure reference formula, it can be obtained that the system converts the volume change of the hollow compressible unit into a pressure change. Moreover, the loss of an extrusion force is small during the conversion so that the measurement result is more accurate. The gas pressure reference formula is $P_1 V_1 = P_2 V_2$. $P_1$ denotes the pressure when the hollow compressible unit is not compressed. $V_1$ denotes the volume when the hollow compressible unit is not compressed. $P_2$ denotes the pressure after the hollow compressible unit is compressed. $V_2$ denotes the volume after the hollow compressible unit is compressed.

The clamping force measurement system in this embodiment of the present disclosure includes the pressure sensing module and the measurement module. The measurement module includes the at least two measurement device and the at least one gas guide device. Each measurement device includes at least one hollow compressible unit. The each measurement device is configured to deform volume to discharge gas when the volume of the each measurement device is deformed during extrusion. The first end of a gas guide device is in communication with the measurement device. The second end of the gas guide device is in communication with the pressure sensing module to transmit the gas to the pressure sensing module. The pressure sensing module is configured to determine the clamping force of the head-mounted device according to the pressure value of the gas. According to the preceding technical solutions, the measurement device includes at least one hollow compressible unit. The volume of the hollow compressible unit is deformed during extrusion, and the gas is discharged through the first end of the gas guide device. The second end of the gas guide device is in communication with the pressure sensing module. Further, the clamping force measurement system converts the volume change of the measurement device into the pressure change. The clamping force is determined through the pressure sensing module. Compared with the related art in which part of the clamping force drives a connection rod to move through a metal plane in the process of measuring the clamping force through the metal plane and the connection rod, resulting in the loss of the extrusion force, the measurement result of the clamping force is more accurate in this embodiment of the present disclosure.

Figure 2:
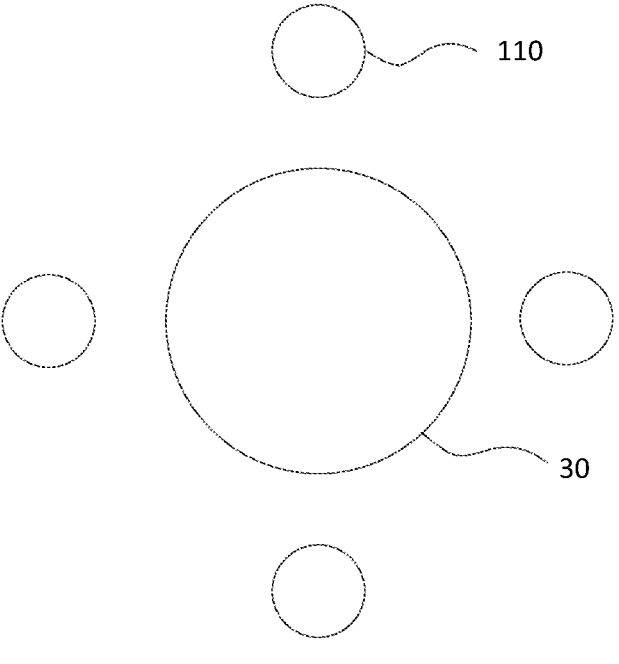
FIG. 2 is a distribution diagram of a measurement device according to an embodiment of the present disclosure.

In an exemplary embodiment, FIG. 2 is a distribution diagram of a measurement device according to an embodiment of the present disclosure. Referring to FIG. 1 and FIG. 2, the measurement module 10 includes multiple measurement devices 110 and multiple gas guide devices 120. The multiple gas guide devices 120 are in communication with the multiple measurement devices 110 in a one-to-one manner. The pressure sensing module 20 includes multiple connection ports 200. A gas guide device 120 is configured to transmit the gas discharged from one of the multiple measurement devices 110 to a respective one of the connection ports 200.

Exemplarily, if the head-mounted device measured by the clamping force measuring system is a headset, the headset is fixed to two sides of the head of a user. The ears of the user are wrapped by earpads. In the related art, the measuring system is generally set at the earpads to measure the magnitude of the clamping force during measurement. For example, the clamping force is measured through a metal plane and a connection rod. The headset is fixed behind a fixture so that the earpads abut against the metal plane. The metal plane is connected to a pressure sensor by using the connection rod to measure the clamping force of the headset. However, according to the method, only the magnitude of the total clamping force applied to the earpads can be measured, but the distribution of the clamping force on the earpads cannot be known. When the distribution of the clamping force applied to the earpads is not uniform, that is, the clamping force applied to some areas is small, which can not make the earpads closely fit the skin of the user, there is a gap in some areas. The sound emitted from a sound generation unit leaks to the outside, causing the distortion of auditory feeling.

Therefore, according to embodiment of the present disclosure, multiple measurement devices 110 and multiple gas guide devices 120 are also provided. The multiple gas guide devices 120 are in communication with the multiple measurement devices 110 in a one-to-one manner. The multiple measurement devices 110 may be located at different positions of an analog device 30. The analog device 30 may be a pseudo-true clamping part of the head-mounted device when analog measurement is performed (for example, when the head-mounted device is a headset, the analog device may be pseudo-true ears, and the headset is clamped on the pseudo-true ears). The pressure sensing module 20 includes the multiple connection ports 200. A gas guide device 120 is configured to transmit the gas discharged from one of the multiple measurement devices 110 to a respective connection port 200. The multiple measurement devices 110 are in communication with the multiple connection ports 200 in the pressure sensing module 20 through the multiple gas guide devices 120. The magnitudes of clamping forces located around the analog device 30 may be measured separately, and the distribution of the clamping forces around the analog device 30 is obtained, thereby providing a basis for subsequent adjustment of the clamping force of the head-mounted device.

With continued reference to FIG. 2, the multiple measurement devices 110 are uniformly distributed along a circumference direction. In an example, the multiple measurement devices 110 are uniformly distributed around the analog device 30 so that the measured clamping forces around the analog device 30 may be uniformly distributed. Then, according to gases discharged from any two adjacent measurement devices, the average value of the clamping forces in a region between positions of the two adjacent measurement devices is determined to be more accurate. Thus, the continuous clamping force distribution information in the head-mounted device is determined to be more accurate according to the average value.

Figure 3:
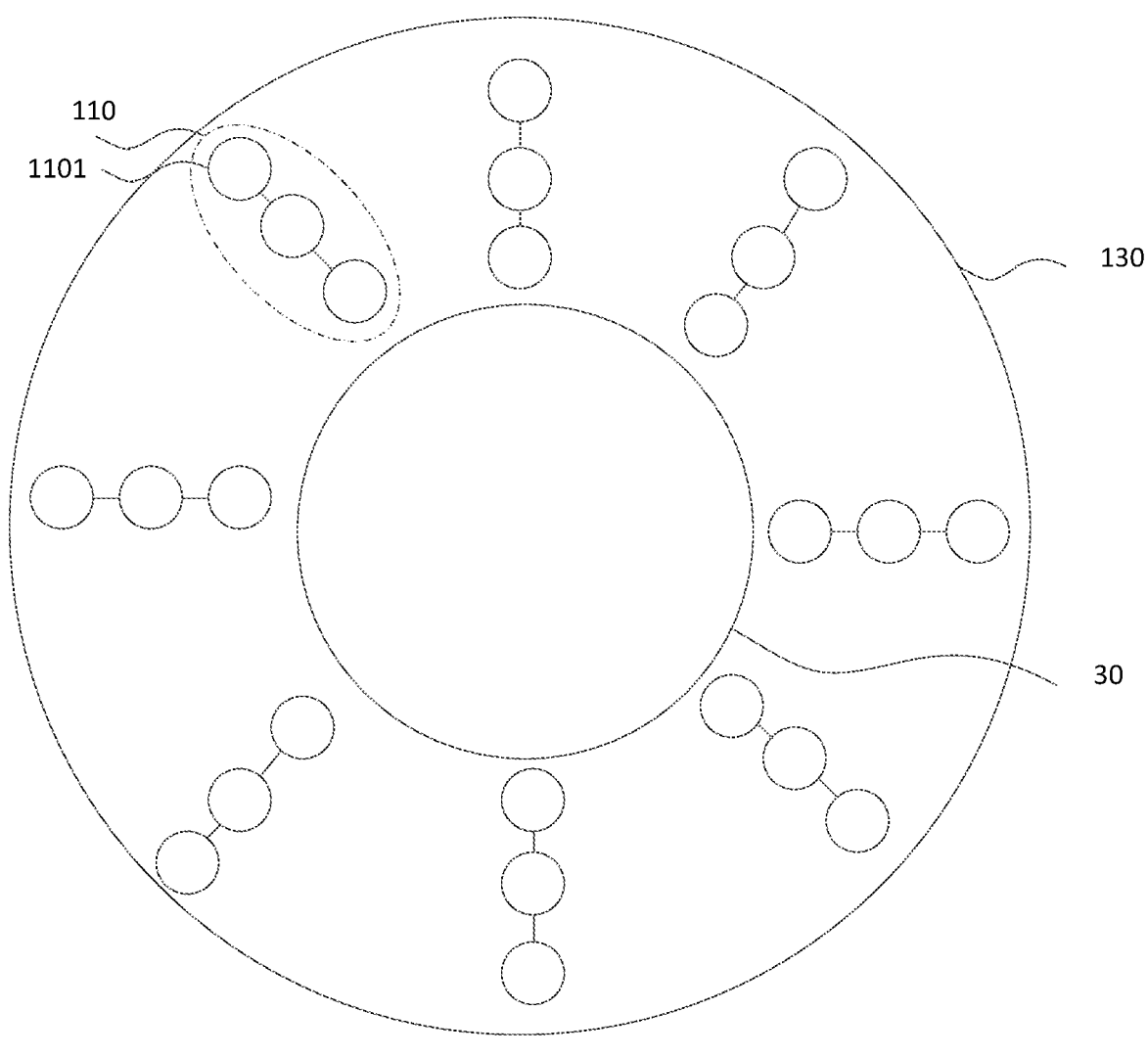
FIG. 3 is a distribution diagram of another measurement device according to an embodiment of the present disclosure.

FIG. 3 is a distribution diagram of another measurement device according to an embodiment of the present disclosure. Referring to FIG. 3, a measurement module 10 also includes an annular double-layer film 130. The annular double-layer film 130 is hollow and annular. Measurement devices 110 are disposed in the annular double-layer film 130. In an example, as shown in FIG. 3, the annular double-layer film 130 surrounds the analog device 30. The analog device 30 is located in the hollow region of the annular double-layer film 130. By disposing the measurement devices 110 in the annular double-layer film 130, that is, between the double-layer films of the annular double-layer film 130, the measurement devices 110 are fixed around the analog device 30. Thus, the measurement devices 110 are more stable and simple to install, thereby preventing the measurement devices 110 from moving during the process of measuring the clamping force and avoiding an error in the final measurement result.

On the basis of the preceding embodiments, and with continued reference to FIG. 1 and FIG. 3, each measurement devices 110 includes multiple hollow compressible units 1101. The multiple hollow compressible units 1101 are disposed in communication. At least one hollow compressible unit 1101 is in communication with a gas guide device 120. In an example, each measurement devices 110 may be a hollow compressible unit matrix. That is, the each measurement devices 110 includes multiple hollow compressible units 1101. The multiple hollow compressible units 1101 are disposed in communication. At least one hollow compressible unit 1101 in the hollow compressible unit matrix is in communication with a gas guide device 120. Thus, the pressure sensing module 20 may measure the pressure value of the hollow compressible unit matrix through the gas guide device 120, thereby measuring the clamping force of the region in which the hollow compressible unit matrix is located. In an example, when the each measurement devices 110 includes multiple hollow compressible units 1101, and the measurement devices 110 are located in the annular double-layer film, the multiple hollow compressible units 1101 are formed to a matrix by using the annular double-layer film. The measurement devices 110 may be replaced or pasted by replacing the whole annular double-layer film or pasting the annular double-layer film so that the manner in which the measurement devices 110 are installed is simple and the installation is more firm.

Figure 4:
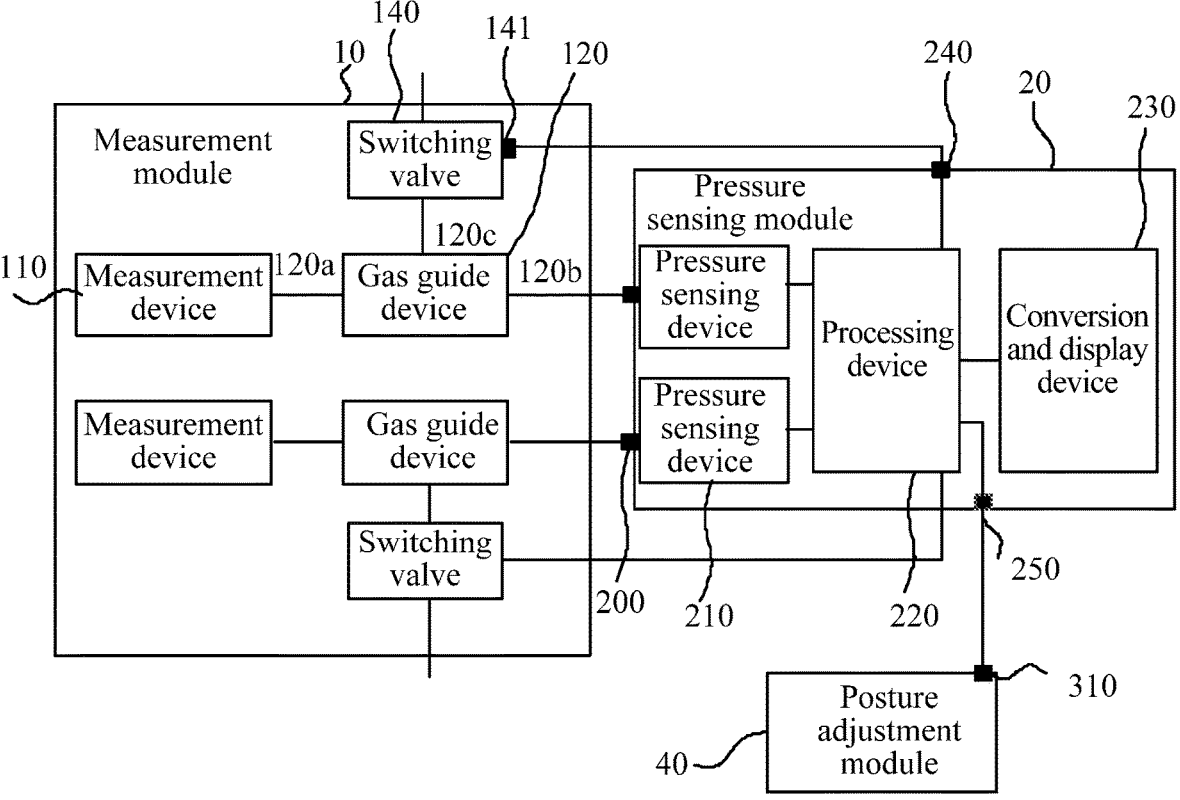
FIG. 4 is a specific diagram illustrating the structure of a clamping force measurement system for a head-mounted device according to an embodiment of the present disclosure.

FIG. 4 is a specific diagram illustrating the structure of a clamping force measurement system for a head-mounted device according to an embodiment of the present disclosure. Referring to FIG. 4, a pressure sensing module 20 includes at least one pressure sensing device 210 and a processing device 220. A pressure sensing device 210 is in communication with a second end 120b of a gas guide device 120 to sense the pressure of a gas. The processing device 220 is electrically connected to the pressure sensing device 210 and configured to determine the clamping force of the head-mounted device according to the pressure of the gas. In addition, the pressure sensing module 20 also includes a conversion and display device 230. The conversion and display device 230 is electrically connected to the processing device 220 and configured to convert an analog signal output from the processing device 220 into a digital signal and display the clamping force determined by the processing device 220.

In an exemplary embodiment, the pressure sensing module 20 includes at least one pressure sensing device 210. A pressure sensing device 210 is in communication with a second end 120b of a gas guide device 120 through a connection port 200. The magnitude of the pressure of a measurement device 110 is detected through the pressure sensing device 210. The difference between a first pressure value detected by the pressure sensing device 210 and the value of atmospheric pressure is calculated through the processing device 220. An analog voltage signal (the voltage range of the analog electrical signal may be 0 V to 5 V) is output to the conversion and display device 230. The conversion and display device 230 converts the analog voltage signal output from the processing device 220 into a digital signal, that is, a digital pressure value. Then, the digital pressure value is transmitted to the processing device 220. A pressure conversion formula is stored in the processing device 220. Further, the processing device 220) determines the clamping force corresponding to the measurement device 110 according to the digital pressure value and the pressure conversion formula. Finally, the determined clamping force is transmitted to the conversion and display device 230. The conversion and display device 230 displays the clamping force corresponding to the measurement device 110. The pressure conversion formula is $F=A \cdot P_2'$. F denotes a clamping force to which the measurement device is subjected. A denotes the force application area of the clamping force. $P_2'$ denotes the digital pressure value converted from the analog voltage signal.

It is to be noted that when multiple measurement devices 110, multiple gas guide devices 120, and multiple pressure sensing devices 210 are provided, the conversion and display device 230 may correspondingly display clamping forces to which the multiple measurement devices 110 are subjected.

In an exemplary embodiment, with continued reference to FIG. 4, a gas guide device 120 also includes a third end 120c and a switching valve 140. The switching valve 140 is disposed in a gas path between the third end 120c and the atmospheric pressure. The pressure sensing module 20 includes a conduction control signal output end 240. The switching valve 140 includes a conduction control signal receiving end 141. The conduction control signal receiving end 141 is electrically connected to the conduction control signal output end 240.

As shown in FIG. 4, a gas guide device 120 also includes a switching valve 140. The switching valve 140 is disposed in the gas path between a third end 120c and the atmospheric pressure. The switching valve 140 is electrically connected to the pressure sensing module 20. In an example, the conduction control signal receiving end 141 of the switching valve 140 is electrically connected to the processing device 220 by the conduction control signal output end 240. The switching valve 140 is controlled to conduct or be off through the processing device 220. Generally, the switching valve 140 is in an off state to ensure that a measurement device 110, a gas guide device 120, and a pressure sensing device 210 are in a sealed state. After the measurement, the measurement device 110 sends a conduction control signal to the conduction control signal receiving end 141 of the switching valve 140 through the conduction control signal output end 240 so that the switching valve 140 is conducted according to the conduction control signal. The measurement device 110 is conducted to the ambient atmosphere through the gas guide device 120 and the switching valve 140, so that the hollow compressible unit in the measurement device 110 recovers an initial state which is the state in which the hollow compressible unit is restored to its uncompressed volume, ensuring that the clamping force measuring system of the head-mounted device can be reused.

On the basis of the preceding embodiments, with continued reference to FIG. 4, the clamping force measurement system includes a posture adjustment module 40. The posture adjustment module 40 includes a clamping force distribution information receiving end 310. The pressure sensing module 20 includes a clamping force distribution information output end 250. The clamping force distribution information output end 250 is electrically connected to the clamping force distribution information receiving end 310. The posture adjustment module 40 is configured to adjust the posture of the head-mounted device according to clamping force distribution information.

In an exemplary embodiment, the pressure sensing module 20 includes a processing device 220. The processing device 220 determines the clamping force of the head-mounted device according to the pressure conversion formula and the digital pressure value. When there is only one measurement device 110, the processing device 220 obtains the clamping force of the one measurement device 110. When there are multiple measurement devices 110, the processing device 220 correspondingly obtains clamping forces of the multiple measurement devices 110. Then, the processing device 220 inputs the clamping force distribution information into the clamping force distribution information receiving end 310 of the posture adjustment module 40 through the clamping force distribution information output end 250. The clamping force distribution information is the clamping force of the one measurement device or the clamping forces of the multiple measurement devices. After receiving the clamping force distribution information, the posture adjustment module 40 compares each of the clamping forces with a preset clamping force to determine the position of the measurement device whose clamping force is less than the preset clamping force. The posture of the head-mounted device is adjusted by the posture adjustment module 4, so that the clamping force of the head-mounted device corresponding to the position of the measurement device whose clamping force is less than the preset clamping force is increased, thereby improving the use experience of a user.

In an exemplary embodiment, on the basis of the preceding embodiments, a measurement device 110 includes a silica gel ball. That is, a hollow compressible unit may be, but is not limited to, a silica gel ball or a compressible airbag. In the embodiment, the silica gel ball is used as an example. The silica gel ball has a hollow compressible characteristic and a certain rebound force. When the switching valve 140 is controlled to conduct by the processing device 220, causing that the measurement device 110 is conducted with the ambient atmosphere through the gas guide device 120 and the switching valve 140, the silica gel ball may be restored to the original volume by using the rebound force. The measurement device 110 does not need to be restored to the initial state by an additional device such as an air pump. Thus, the restoring manner of the measurement device 110 is simple.

Figure 5:
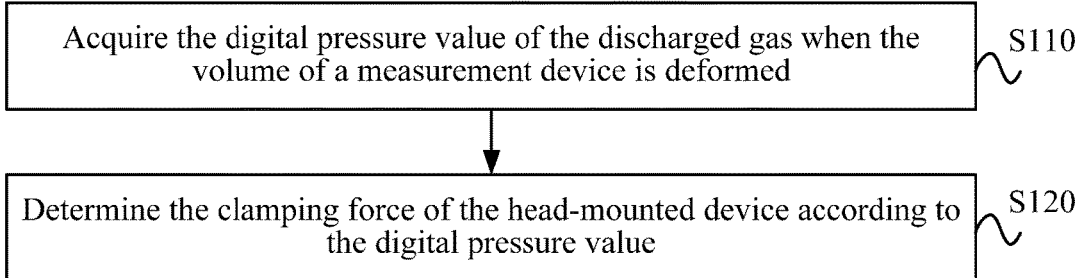
FIG. 5 is a flowchart of a clamping force measurement method for a head-mounted device according to an embodiment of the present disclosure.

Based on the same inventive concept, an embodiment of the present disclosure also provides a clamping force measurement method for a head-mounted device. The method is applied by the preceding clamping force measurement system for a head-mounted device. FIG. 5 is a flowchart of a clamping force measurement method for a head-mounted device according to an embodiment of the present disclosure. As shown in FIG. 5, the dynamic pressure simulation test method includes the following steps.

In S110, a digital pressure value of a discharged gas is acquired when the volume of a measurement device is deformed.

First, the measurement device is fixed at a position where clamping force measurement is required. Then, the head-mounted device is disposed on the measurement device. The measurement device includes at least one hollow compressible unit. The at least one hollow compressible unit is deformed under the extrusion of the head-mounted device. By utilizing the characteristic of the volume deformation of the hollow compressible unit due to the compression of the gas inside, the volume change of the hollow compressible unit is converted into a pressure change through a gas guide device. When the volume of the measurement device is deformed, a first pressure value of the discharged gas is obtained through a pressure sensing module. The pressure sensing module calculates the difference between the first pressure value of the discharged gas when the volume of the measurement device is deformed and the pressure value of the standard atmospheric pressure and outputs an analog voltage signal (the voltage range of the analog voltage signal may be 0 V to 5 V). Then, the pressure sensing module converts the output analog voltage signal into the digital pressure value.

In S120, the clamping force of the head-mounted device is determined according to the digital pressure value.

A pressure conversion formula is stored in the pressure sensing module. After the digital pressure value is obtained, the digital pressure value converted from the analog voltage signal is substituted into the pressure conversion formula. Then, the clamping force of the head-mounted device is determined. The pressure conversion formula is $F = A \cdot P_2'$. $F$ denotes a clamping force to which the measurement device is subjected. $A$ denotes the force application area of the clamping force. $P_2'$ denotes the digital pressure value converted from the analog voltage signal.

According to the embodiment of the present disclosure, the pressure value of the discharged gas is obtained when the volume of the measurement device is deformed. The clamping force of the head-mounted device is determined according to the pressure value. The volume of the measurement device is deformed during extrusion, and the gas is discharged through a first end of a gas guide device. A second end of the gas guide device is in communication with the pressure sensing module so that the clamping force measurement system converts the volume change of the measurement device into the pressure change. The clamping force is determined through the pressure sensing module. Compared with the related art in which part of the clamping force drives a connection rod to move through a metal plane in the process of measuring the clamping force through the metal plane and the connection rod, resulting in the loss of an extrusion force, the measurement result of the clamping force is more accurate in this embodiment of the present disclosure.

On the basis of the preceding embodiments, FIG. 6 is a specific flowchart of a clamping force measurement method for a head-mounted device according to an embodiment of the present disclosure. As shown in FIG. 6, the specific workflow of the clamping force measurement method for the head-mounted device is as follows.

In S210, the actual clamping force of the head-mounted device is determined under a preset clamping force. A correction parameter of the clamping force measurement system is determined according to the preset clamping force and the actual clamping force. The clamping force measurement system is corrected according to the correction parameter.

In an exemplary embodiment, a measurement device deforms under the action of an extrusion force. Then, a first pressure value of the measurement device is measured by a pressure sensing device. A processing device calculates the difference between the first pressure value detected by the pressure sensing device and the value of atmospheric pressure and outputs an analog voltage signal. To prevent an error in the analog voltage signal output from the processing device, resulting in an error between an actual extrusion force finally measured and an extrusion force provided by the head-mounted device, multiple preset clamping forces are provided. For example, the preset clamping forces of the measurement device are set to be 10 N, 50 N, 100 N, and the like. Then, the measurement device is extruded by the preset clamping forces. The actual clamping forces at the position of the corresponding measurement device under each of the preset clamping forces are determined through the pressure conversion formula stored in the processing device. The processing device compares the measured actual clamping forces with the preset clamping forces respectively. If the difference between a measured actual clamping force and a preset clamping forces are greater than a set value, the processing device corrects the measurement device. If the difference between the measured actual clamping force and the preset clamping forces is less than a set value, it is indicated that the measurement device does not need to be corrected and the error is in the acceptable range, and the measurement may be continued, to improve the accuracy of the measurement result.

In S220, a switching valve is adjusted to a conduction state.

In an exemplary embodiment after the measurement device is corrected as described above, it is necessary to adjust the measurement device to an initial state first, that is, to adjust the switching valve to a conduction state through the processing device. Thus, the pressure in the measurement device is the same as the atmospheric pressure, thereby avoiding the influence of the previous measurement on the subsequent measurement.

In S230, the switching valve is adjusted to an off state.

After the measurement device is adjusted to the initial state, to ensure that the measurement device, a gas guide device, and the pressure sensing device in a sealed state, it is also necessary to adjust the switching valve to the off state through the processing device to avoid affecting subsequent measurement steps.

In S240, the first pressure value of the pressure sensing device is acquired. According to the difference between the first pressure value and the value of atmospheric pressure, the digital pressure value of the discharged gas is determined when the volume of the measurement device is deformed.

In an exemplary embodiment, a pressure sensing module includes at least one pressure sensing device, a processing device, and a conversion and display device. When the volume of the measurement device is deformed, the first pressure value of the discharged gas is acquired through the pressure sensing device. The processing device calculates the difference between the first pressure value of the discharged gas when the volume of the measurement device is deformed and the value of atmospheric pressure and outputs the analog voltage signal (the voltage range of the analog voltage signal may be 0 V to 5 V). Then, the conversion and display device converts the output analog voltage signal into the digital pressure value. In addition, when the volume of multiple measurement devices is deformed, digital pressure values of the discharged gases may be acquired through multiple pressure sensing devices in the pressure sensing module. The multiple measurement devices may be uniformly distributed around an analog device to measure the extrusion force distribution of the head-mounted device.

In S250, the clamping force of the head-mounted device is determined according to the pressure conversion formula and the digital pressure value.

The pressure conversion formula is stored in the pressure sensing module. After the digital pressure value is obtained, the digital pressure value converted from the analog voltage signal is substituted into the pressure conversion formula. Then, the clamping force of the head-mounted device is determined. The clamping force of the corresponding measurement device is displayed through the conversion and display device. The pressure conversion formula is $F = A \cdot P_2'$. F denotes a clamping force to which the measurement device is subjected. A denotes the force application area of the clamping force. $P_2'$ denotes the digital pressure value converted from the analog voltage signal. In addition, when there are multiple measurement devices, the processing device may calculate the clamping forces to which the measurement devices at multiple positions are subjected. The conversion and display device correspondingly displays the clamping forces to which the measurement devices at the multiple positions are subjected.

In S260, according to gases discharged from any two adjacent measurement devices, the average value of clamping forces in a region between positions of the two adjacent measurement devices is determined. Continuous clamping force distribution information in the head-mounted device according to the average value is determined.

In an exemplary embodiment, a measurement module includes multiple measurement devices. The clamping forces measured by measurement devices at multiple positions should be continuously distributed. In fact, even though the positions of the measurement devices are densely distributed, the measured clamping force distribution is still relatively dispersed due to the volume limitation of the measurement devices. In an example, after the clamping forces of the measurement devices at the multiple positions are measured by the clamping force measurement system of the head-mounted device, the average value of the clamping forces measured by two adjacent measurement devices may be used as the clamping force in the region between the positions of the two adjacent measurement devices. Thus, continuous clamping force distribution information can be obtained without adjusting the positions of the measurement devices for measurement.

In S270, the clamping force distribution information is output. The clamping force at a position where the clamping force is lower than the preset clamping force in the head-mounted device is prompted to adjust.

The pressure sensing module also includes a conversion and display device. The conversion and display device is electrically connected to the processing device. The clamping force distribution information may be output to the conversion and display device for the conversion and display device to display the clamping force distribution information, and prompt to adjust the clamping force at a position where the clamping force is lower than the preset clamping force in the head-mounted device. In an example, the processing device determines the clamping force of the head-mounted device through the pressure conversion formula and digital pressure values corresponding to the multiple measurement devices. The processing device determines, according to gases discharged from any two adjacent measurement devices, the average value of clamping forces in a region between positions of the two adjacent measurement devices. Moreover, the processing device determines the continuous clamping force distribution information in the head-mounted device according to the average value. After these, the processing device sends the clamping force distribution information to a conversion and display module. The conversion and display device displays the clamping force distribution information and labels and prompts the position where the clamping force in the head-mounted device corresponding to the clamping force distribution information is lower than the preset clamping force to facilitate subsequent adjustment of the clamping force at the relevant position by a worker.

Alternatively, the clamping force measurement system includes a posture adjustment module. The posture adjustment module includes a clamping force distribution information receiving end. The pressure sensing module includes a clamping force distribution information output end. The clamping force distribution information output end is electrically connected to the clamping force distribution information receiving end. The clamping force distribution information may be output to the posture adjustment module to control the posture adjustment module to adjust the clamping force at the position where the clamping force is lower than the preset clamping force in the head-mounted device. That is, the processing device outputs the clamping force distribution information to the posture adjustment module. The posture adjustment module compares each clamping force in the clamping force distribution information with the preset clamping force to determine the position of the measurement device whose clamping force is less than the preset clamping force, that is, determine the position where the clamping force in the head-mounted device corresponding to the clamping force distribution information is lower than the preset clamping force. The posture of the head-mounted device is adjusted so that the clamping force of the head-mounted device corresponding to the position of the measurement device whose clamping force is less than the preset clamping force is increased, thereby improving the use experience of a user.

In the embodiment of the present disclosure, when the volume of a measurement device is deformed, the digital pressure value of the discharged gas is acquired. Further, digital pressure values of multiple measurement devices uniformly distributed along the circumference may be acquired. The clamping force distribution of the head-mounted device is determined according to the digital pressure values of the multiple measurement devices. Then, the clamping force distribution is adjusted. Thus, the clamping force distribution of the head-mounted device is uniform, thereby improving the comfort and auditory feeling of a user. In addition, before measurement is performed, the clamping force obtained by measurement is compared with a set clamping force by the processing device. The measurement device is corrected according to the compared difference, thereby further improving the accuracy of the measurement. Moreover, the average value of the clamping forces measured by two adjacent measurement devices is used as the clamping force in the region between the positions of the two adjacent measurement devices to obtain a continuous clamping force distribution. Thus, the continuous clamping force distribution is obtained in a simple manner.

It is to be noted that the preceding are only preferred embodiments of the present disclosure and technical principles used therein. It is to be understood by those skilled in the art that the present disclosure is not limited to the embodiments described herein. Those skilled in the art can make various apparent modifications, adaptations, and substitutions without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A clamping force measurement system for a head-mounted device, comprising a pressure sensing module and a measurement module, wherein the measurement module comprises at least two measurement devices and at least one gas guide device, wherein each of the at least two measurement devices comprises at least one hollow compressible unit, and the each of the at least two measurement devices is configured to discharge gas when volume of the each of the at least two measurement devices is deformed during extrusion;

a first end of a gas guide device of the at least one gas guide device is in communication with a measurement device of the at least two measurement devices, and a second end of the gas guide device of the at least one gas guide device is in communication with the pressure sensing module to transmit the gas to the pressure sensing module; and the pressure sensing module is configured to determine a clamping force of the head-mounted device according to a pressure value of the gas, wherein a clamping space is formed between two of the at least two measuring devices and the clamping space is configured for clamping to the head.

2. The clamping force measurement system according to claim 1, wherein the measurement module comprises a plurality of measurement devices and a plurality of gas guide devices, and the plurality of gas guide devices are in communication with the plurality of measurement devices in a one-to-one manner; and the pressure sensing module comprises a plurality of connection ports, and a gas guide device of the plurality of gas guide devices is configured to transmit gas discharged from one of the plurality of measurement devices to a respective one of the plurality of connection ports.

3. The clamping force measurement system according to claim 2, wherein the plurality of measurement devices are uniformly distributed along a circumference direction.

4. The clamping force measurement system according to claim 2, wherein the pressure sensing module comprises at least one pressure sensing device and a processing device, wherein a pressure sensing device of the at least one pressure sensing device is in communication with the second end of the gas guide device of the at least one gas guide device to sense a pressure of the gas; and the processing device is electrically connected to the pressure sensing device and configured to determine the clamping force of the head-mounted device according to the pressure of the gas.

5. The clamping force measurement system according to claim 1, wherein the measurement module further comprises an annular double-layer film, wherein the annular double-layer film is hollow and annular, and the at least two measurement device is disposed in the annular double-layer film.

6. The clamping force measurement system according to claim 1, wherein the each of the at least two measurement device is a hollow compressible unit matrix, and the each of the at least two measurement device comprises a plurality of hollow compressible units; and the plurality of hollow compressible units are disposed in communication, and at least one of the plurality of hollow compressible units is in communication with the gas guide device of the at least one gas guide device.

7. The clamping force measurement system according to claim 1, wherein the pressure sensing module comprises at least one pressure sensing device and a processing device, wherein a pressure sensing device of the at least one pressure sensing device is in communication with the second end of the gas guide device of the at least one gas guide device to sense a pressure of the gas; and the processing device is electrically connected to the pressure sensing device and configured to determine the clamping force of the head-mounted device according to the pressure of the gas.

8. The clamping force measurement system according to claim 7, wherein the pressure sensing module further comprises a conversion and display device, wherein the conversion and display device is electrically connected to the processing device and configured to convert an analog signal output from the processing device into a digital signal and display the clamping force determined by the processing device.

9. The clamping force measurement system according to claim 1, wherein the gas guide device further comprises a third end and a switching valve, and the switching valve is disposed in a gas path between the third end and atmospheric pressure; and the pressure sensing module comprises a conduction control signal output end, the switching valve comprises a conduction control signal receiving end, and the conduction control signal receiving end is electrically connected to the conduction control signal output end.

10. The clamping force measurement system according to claim 1, wherein the clamping force measurement system comprises a posture adjustment module, wherein the posture adjustment module comprises a clamping force distribution information receiving end, the pressure sensing module comprises a clamping force distribution information output end, the clamping force distribution information output end is electrically connected to the clamping force distribution information receiving end, and the posture adjustment module is configured to adjust a posture of the head-mounted device according to clamping force distribution information.

11. A clamping force measurement method for a head-mounted device, applied to a clamping force measurement system for a head-mounted device, wherein the clamping force measurement system for a head-mounted device comprises a pressure sensing module and a measurement module, wherein the measurement module comprises at least two measurement device and at least one gas guide device, wherein each of the at least two measurement device comprises at least one hollow compressible unit, and the each of the at least two measurement device is configured to discharge gas when volume of the each of the at least two measurement device is deformed during extrusion; a first end of a gas guide device of the at least one gas guide device is in communication with a measurement device of the at least two measurement devices, and a second end of the gas guide device of the at least one gas guide device is in communication with the pressure sensing module to transmit the gas to the pressure sensing module; and the pressure sensing module is configured to determine a clamping force of the head-mounted device according to a pressure value of the gas; wherein a clamping space is formed between two of the at least two measuring devices and the clamping space is configured for clamping to the head; and the clamping force measurement method comprises:

acquiring a digital pressure value of a discharged gas when volume of the each of the at least two measurement device is deformed; and determining the clamping force of the head-mounted device according to the digital pressure value.

12. The clamping force measurement method according to claim 11, before acquiring the digital pressure value of the discharged gas when the volume of the each of the at least two measurement device is deformed, further comprising:

determining an actual clamping force of the head-mounted device under a preset clamping force;

determining a correction parameter of the clamping force measurement system according to the preset clamping force and the actual clamping force; and correcting the clamping force measurement system according to the correction parameter.

13. The clamping force measurement method according to claim 11, wherein the gas guide device of the at least one gas guide device further comprises a third end and a switching valve, and the switching valve is disposed in a gas path between the third end and atmospheric pressure; and the pressure sensing module comprises a conduction control signal output end, the switching valve comprises a conduction control signal receiving end, and the conduction control signal receiving end is electrically connected to the conduction control signal output end; and before acquiring the digital pressure value of the discharged gas when the volume of the measurement device is deformed, the method further comprises:

adjusting the switching valve to a conduction state so that pressure in the measurement device is the same as the atmospheric pressure.

14. The clamping force measurement method according to claim 13, after adjusting the switching valve to the conduction state so that the pressure in the measurement device is the same as the atmospheric pressure, further comprising:

adjusting the switching valve to an off state.

15. The clamping force measurement method according to claim 11, wherein the pressure sensing module comprises at least one pressure sensing device, a processing device, and a conversion and display device; and acquiring the digital pressure value of the discharged gas when the volume of the measurement device is deformed comprises:

acquiring a first pressure value of the at least one pressure sensing device; and according to a difference between the first pressure value and a value of atmospheric pressure, determining the digital pressure value of the discharged gas when the volume of the measurement device is deformed.

16. The clamping force measurement method according to claim 11, wherein determining the clamping force of the head-mounted device according to the digital pressure value comprises:

determining the clamping force of the head-mounted device according to a pressure conversion formula and the digital pressure value, wherein the pressure conversion formula is $F=A \cdot P_2'$, wherein F denotes a clamping force to which the measurement device is subjected, A denotes force application area of the clamping force, and $P_2'$ denotes the digital pressure value converted from an analog voltage signal.

17. The clamping force measurement method according to claim 11, wherein the measurement module comprises a plurality of measurement devices; and after determining the clamping force of the head-mounted device according to the digital pressure value, the method further comprises:

according to gases discharged from any two adjacent measurement devices of the plurality of measurement devices, determining an average value of clamping forces in a region between positions of the two adjacent measurement devices; and determining continuous clamping force distribution information in the head-mounted device according to the average value.

18. The clamping force measurement method according to claim 17, after determining the continuous clamping force distribution in the head-mounted device according to the average value, further comprising:

outputting the clamping force distribution information, and prompting to adjust a clamping force at a position where the clamping force is lower than a preset clamping force in the head-mounted device.

19. The clamping force measurement method according to claim 18, wherein the pressure sensing module comprises a processing device and a conversion and display device, and the conversion and display device is electrically connected to the processing device; and outputting the clamping force distribution information, and prompting to adjust the clamping force at the position where the clamping force is lower than the preset clamping force in the head-mounted device comprises:

outputting the clamping force distribution information to the conversion and display device for the conversion and display device to display the clamping force distribution information and to prompt to adjust the clamping force at the position where the clamping force is lower than the preset clamping force in the head-mounted device.

20. The clamping force measurement method according to claim 18, wherein the clamping force measurement system comprises a posture adjustment module; and the posture adjustment module comprises a clamping force distribution information receiving end, the pressure sensing module comprises a clamping force distribution information output end, and the clamping force distribution information output end is electrically connected to the clamping force distribution information receiving end; and outputting the clamping force distribution information, and prompting to adjust the clamping force at the position where the clamping force is lower than the preset clamping force in the head-mounted device comprises:

outputting the clamping force distribution information to the posture adjustment module to control the posture adjustment module to adjust the clamping force at the position where the clamping force is lower than the preset clamping force in the head-mounted device.

* * * * *